United States Patent
Seaward et al.

(10) Patent No.: US 9,825,962 B2
(45) Date of Patent: Nov. 21, 2017

(54) CONFIGURABLE SHARING OF USER INFORMATION

(71) Applicant: Accenture Global Services Limited, Dublin (IE)

(72) Inventors: Leona Seaward, Oxfordshire (GB); Jocelyn A. Fry, London (GB); Julian Henry Allen, Surrey (GB); Richard Beaumont, Surrey (GB)

(73) Assignee: Accenture Global Services Limited, Dublin (IE)

( * ) Notice: Subject to any disclaimer, the term of this patent is extended or adjusted under 35 U.S.C. 154(b) by 57 days.

(21) Appl. No.: 14/798,653

(22) Filed: Jul. 14, 2015

(65) Prior Publication Data
US 2016/0285884 A1    Sep. 29, 2016

Related U.S. Application Data

(60) Provisional application No. 62/139,431, filed on Mar. 27, 2015.

(51) Int. Cl.
*H04L 29/06* (2006.01)
*G06F 21/62* (2013.01)
(Continued)

(52) U.S. Cl.
CPC .......... *H04L 63/102* (2013.01); *G06F 21/316* (2013.01); *G06F 21/60* (2013.01);
(Continued)

(58) Field of Classification Search
CPC ............. G06F 21/6245; G06F 21/6218; G06F 21/6272; G06F 21/316; G06F 21/60; H04L 63/102; H04L 63/104; H04W 12/02
See application file for complete search history.

(56) References Cited

U.S. PATENT DOCUMENTS 7,107,269 B2   9/2006   Arlein
8,321,918 B2   11/2012  Cho
(Continued)

OTHER PUBLICATIONS

Xu, Yabo, et al. "Privacy-enhancing personalized web search." Proceedings of the 16th international conference on World Wide Web. ACM, 2007. pp. 591-600.*
(Continued)

*Primary Examiner* — Kari Schmidt
(74) *Attorney, Agent, or Firm* — Fish & Richardson P.C.

(57) ABSTRACT

Methods, systems, and apparatus, including computer programs encoded on a computer storage medium, for sharing information. The methods, systems, and apparatus include actions of receiving user information entered by a user through a user interface and generating a user profile based at least on the user information. Additional actions include receiving an identification of a particular storage provider location from the user through the user interface, storing the user profile at the particular storage provider location, and receiving privacy settings from the user. Additional actions include receiving a request from the user to access a network resource associated with a particular user information consumer. Further actions include obtaining the user profile from the particular storage provider location, generating a user information collection including at least a portion of the user information from the user profile, and providing the generated user information collection to the particular user information consumer.

17 Claims, 4 Drawing Sheets

(51) Int. Cl.
*G06F 21/60* (2013.01)
*H04W 12/02* (2009.01)
*G06F 21/31* (2013.01)

(52) U.S. Cl.
CPC ...... *G06F 21/6218* (2013.01); *G06F 21/6245* (2013.01); *G06F 21/6272* (2013.01); *H04L 63/104* (2013.01); *H04W 12/02* (2013.01)

(56) References Cited

U.S. PATENT DOCUMENTS

| | | | |
|---|---|---|---|
| 9,092,642 B2* | 7/2015 | Prakash | |
| 9,203,912 B2* | 12/2015 | Krishnaswamy | G06Q 30/02 |
| 9,391,789 B2* | 7/2016 | Krishnaswamy | G06Q 10/10 |
| 9,392,074 B2* | 7/2016 | Aggarwal | G06Q 30/02 |
| 9,398,113 B2* | 7/2016 | Aggarwal | G06F 17/30867 |
| 9,400,893 B2* | 7/2016 | Tseng | G06F 21/6245 |
| 9,449,181 B1* | 9/2016 | Umapathy | G06F 21/62 |
| 9,485,322 B2* | 11/2016 | Krishnaswamy | H04L 67/306 |
| 2005/0233744 A1* | 10/2005 | Karaoguz | H04W 12/08 455/432.3 |
| 2005/0278656 A1 | 12/2005 | Goldthwaite | |
| 2006/0074769 A1* | 4/2006 | Looney | G06Q 30/02 705/14.66 |
| 2006/0224514 A1* | 10/2006 | Buschi | G06Q 30/06 705/50 |
| 2008/0004949 A1* | 1/2008 | Flake | G06F 21/6245 705/14.69 |
| 2008/0109491 A1* | 5/2008 | Gupta | G06Q 10/10 |
| 2009/0070412 A1* | 3/2009 | D'Angelo | G06Q 10/10 709/203 |
| 2011/0246213 A1* | 10/2011 | Yarvis | G06Q 30/00 705/1.1 |
| 2013/0073473 A1* | 3/2013 | Heath | G06Q 30/02 705/319 |
| 2013/0073628 A1* | 3/2013 | Barber | G06F 21/31 709/204 |
| 2013/0342866 A1* | 12/2013 | Hansen | H04N 1/4413 358/1.14 |
| 2014/0129942 A1* | 5/2014 | Rathod | H04N 21/44222 715/720 |
| 2014/0279007 A1* | 9/2014 | Srinivasan | G06Q 30/0261 705/14.58 |
| 2014/0282884 A1* | 9/2014 | Bao | G06F 21/31 726/4 |
| 2015/0074825 A1* | 3/2015 | Blake | G06F 21/6245 726/28 |
| 2015/0101022 A1* | 4/2015 | Zent | G06F 21/31 726/4 |
| 2015/0324810 A1* | 11/2015 | Vincent | G06Q 30/0201 705/7.29 |
| 2016/0205136 A1* | 7/2016 | Davenport | G06Q 30/02 726/26 |
| 2017/0186037 A1* | 6/2017 | Brady | G06Q 30/0257 |

OTHER PUBLICATIONS

A. Lugmayr, S. Reymann, S. Kemper, T. Dorsch and P. Roman, "Bits of Personality Everywhere: Implicit User-Generated Content in the Age of Ambient Media," 2008 IEEE International Symposium on Parallel and Distributed Processing with Applications, Sydney, NSW, 2008, pp. 516-521.*

Y. Mo, J. Chen, X. Xie, C. Luo and L. T. Yang, "Cloud-Based Mobile Multimedia Recommendation System With User Behavior Information," in IEEE Systems Journal, vol. 8, No. 1, pp. 184-193, Mar. 2014.*

* cited by examiner

CONFIGURABLE SHARING OF USER INFORMATION

CROSS-REFERENCE TO RELATED APPLICATIONS

This application claims the benefit of U.S. Provisional Patent Application No. 62/139,431, filed Mar. 27, 2015, which is hereby incorporated by reference in its entirety.

TECHNICAL FIELD

This disclosure generally relates to configurable sharing of user information.

BACKGROUND

Communications networks such as the Internet allow users to retrieve network resources, such as web pages provided by web servers connected to the network, through computing devices. In some cases, the web servers may collect and store information about the user or the computing device used to retrieve the network resource. This information may include demographic information explicitly provided by the user (e.g., user's age, sex, etc.), information about the computing device (e.g., operating system, manufacturer, etc.).

SUMMARY

In general, an aspect of the subject matter described in this specification may involve a process for configurable sharing of user information. The system may include a user device that enables a user to specify privacy settings for sharing user information with user information consumers. For example, the user device may enable the user to select to share one of the user's full street address, street name, zip code, or state of residence, when visiting a website of the particular retailer.

The user device may store the user information of the user in a location controlled by the user. In response to a request from the user to access a network resource associated with a particular user information consumer, the user device may obtain the user information from the location and, based at least on the privacy settings specified by the user, selectively share user information with the particular user information consumer. Accordingly, the system may enable users to provide user information and selectively share varying amounts of the user information with multiple different user information consumers.

In some aspects, the subject matter described in this specification may be embodied in methods that may include the actions of receiving user information entered by a user through a user interface, generating a user profile based at least on the user information, and receiving an identification of particular storage provider location from the user through the user interface. Additional actions include storing the user profile at the particular storage provider location and receiving privacy settings from the user, the privacy settings specifying portions of the user information to be provided to particular user information consumers. Further actions include receiving a request from the user to access a network resource associated with a particular user information consumer. In response to receiving the request to access the network resource associated with the particular user information consumer, actions include obtaining the user profile from the particular storage provider location, generating a user information collection including at least a portion of the user information from the user profile, where the portion of the user information included in the collection is determined based on the portion of the user information specified for the particular user information consumer in the privacy settings, and providing the generated user information collection to the particular user information consumer.

Other versions include corresponding systems, apparatus, and computer programs, configured to perform the actions of the methods, encoded on computer storage devices.

These and other versions may each optionally include one or more of the following features. For instance, in some implementations actions include receiving content from the particular user information consumer, where the content is customized based at least on the generated user information collection.

In certain aspects, generating a user information collection including at least a portion of the user information from the user profile includes abstracting the portion of the user information based at least on the privacy settings.

In some aspects, receiving an identification of a particular storage provider location from the user through the user interface includes receiving, through the user interface, (i) an identification of the particular storage provider location and (ii) account credentials, of the user, associated with the particular storage provider location.

In some implementations, obtaining the user profile from the particular storage provider location includes providing the account credentials to the particular storage provider location, selecting a storage rule associated with the particular storage provider location from a collection of storage rules associated with corresponding storage provider locations, and obtaining the user profile from the particular storage provider location based on the storage rule.

In certain aspects, storing the user profile at the particular storage provider location includes selecting a storage rule associated with the particular storage provider location from a collection of storage rules associated with corresponding storage provider locations and storing the user profile at the particular storage provider based at least on the storage rule.

In some aspects, the privacy settings specify an amount of abstraction for the portions of the user information to be provided to particular user information consumers.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
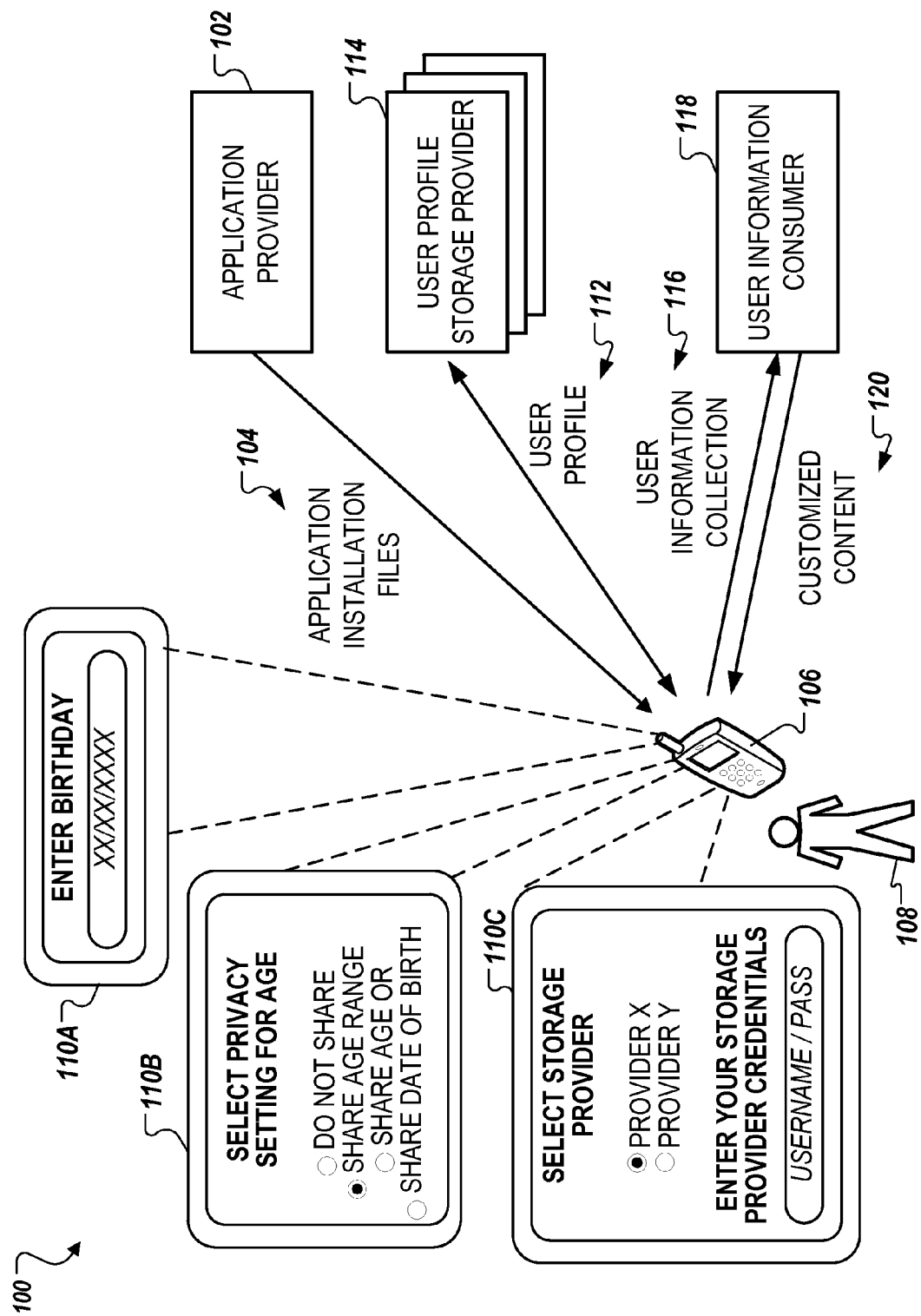
FIG. 1 is a block diagram of an example system for sharing information.

Hosts of network resources, such as web servers, receive information about users and computing devices that access the network resources. These hosts or "user information consumers" may customize content provided to users based on information about the users. For example, a user information consumer may customize content for a user based on a current location of the user. However, users may wish to limit information shared with user information consumers. For example, a user may want the user's street address to be kept private from a user information consumer.

The present disclosure describes techniques for configurable sharing of user information. One example method includes the actions of receiving user information entered by a user through a user interface, generating a user profile based at least on the user information, and receiving an identification of particular storage provider location from the user through the user interface. Additional actions include storing the user profile at the particular storage provider location and receiving privacy settings from the user, where the privacy settings specify portions of the user information to be provided to particular user information consumers. Further actions include receiving a request from the user to access a network resource associated with a particular user information consumer. In response to receiving the request to access the network resource associated with the particular user information consumer, actions include obtaining the user profile from the particular storage provider location, generating a user information collection including at least a portion of the user information from the user profile, and providing the generated user information collection to the particular user information consumer, where the portion of the user information included in the collection is determined based on the portion of the user information specified for the particular user information consumer in the privacy settings. In some implementations, the information entered by a user may be anonymized using analytics, e.g., user input may be analyzed to provide actionable insight. For example, a user may indicate stores that the user likes to shop at and in response a user information consumer may instead receive an indication of a user preference for patterned clothing.

The techniques described herein may provide the following advantages. By allowing the user to configure which pieces of information are provided to particular user information consumers, the user may be afforded greater control over the distribution of their information than available using previous techniques. Further, by storing the user profile including the user information at a user-managed storage provider rather than a location managed by the application provider, the user's privacy and control of their information may be further increased. Additionally, the user information consumers may benefit as (a) the consumers may not need to hold their own version of the data which may provide a cost saving, (b) the consumers may identify important attributes from the user earlier on in the user interaction, (c) the data the consumers receive may be more easily analyzed, and (d) users may be more likely to have increased trust in the information consumers.

FIG. 1 is a block diagram of an example system 100 for providing configurable sharing of user information. Briefly, and as described in further detail below, the system 100 may include an application provider 102, a user device 106, user profile storage providers 114, and a user information consumer 118.

The application provider 102 may be an entity that provides application installation files 104 for the user device 106. For example, the application provider 102 may be an application developer that develops an application, or an application storefront that receives an application from an application developer and provides the application installation files 104 to the user device 106. The application provider 102 may include a server that may receive a request for an application from the user device 106, and in response, provide the application installation files to the user device 106.

The user device 106 may be a computing device used by the user 108. For example, the user device 106 may be a mobile computing device, a desktop computer, a laptop computer, a tablet computer, or some other type of computing device. The user device 106 may request an application for sharing user information from the application provider 102 and, in response, receive the application installation files 104 from the application provider 102. The user device 106 may install the application and execute the application. In some implementations, the application may be pre-installed or part of an operating system of the user device 106.

The application may cause the user device 106 to generate a user interface 110A, 110B, and 110C (collectively user interfaces 110). The user interfaces 110 may enable the user 108 to enter user information, specify privacy settings, enter a user profile storage provider location, request access to a network resource, or perform other actions.

The user interface 110A is an interface that enables the user 108 to provide user information. For example, the user interface 110A includes a text field for a user to enter the user's birthday. In some examples, the interface 110 may include one or more of a calendar element for a user to select a birth date, a drop down menu for the user to make a particular selection of a state of residence, or checkboxes for the user to indicate brands of interest.

The user information entered by the user 108 may be used to generate a user profile 112. The user profile 112 may be a collection of information that describes a profile of a user. For example, the user profile 112 may include information describing a user's date of birth, residence address, occupation, gender, brand preferences, hobbies, or other personal information.

The user interface 110B is an interface for specifying privacy settings. For example, the user interface 110B includes radio buttons or a slider for the user to select one or more of, not share the user's age, share an age range of the user, or some other range, share the user's age in years, or share the user's date of birth. The interface 110 may include other elements for specifying privacy settings. For example, the user device 106 may provide a user interface for the user 108 to specify different privacy settings for age, residence address, occupation, or other personal information. The privacy settings may vary based on the type of user information. For example, user information for gender may be a binary setting that is either sharing or not sharing, while user information for occupation may include settings for job field, job title, or job title and employer.

The different privacy setting options for a particular type of user information may be referred to as different degrees of sharing for the particular type of user information. For example, a degree of sharing may correspond to not sharing, another degree of sharing may correspond to abstracting the user information by a particular amount, and another degree of sharing may correspond to providing the user information without abstraction.

The user device 106 may additionally or alternatively enable the user 108 to specify privacy settings that are specific to particular user information consumers. For example, the user device 106 may provide a user interface for the user 108 to specify, for various portions of the user profile, different privacy settings for different retailers.

The user interface 110C is an interface that enables the user 108 to specify a storage provider with which to store the user profile 112. For example, the user interface 110C may include a list of three different cloud storage providers and enable the user 108 to select one of the three cloud storage providers to store the user's profile, and then enable the user 108 to enter account credentials for the selected cloud storage provider. Account credentials may include a user's account name and password. In another example, a user interface may enable the user 108 to enter a name of a particular storage provider to specify the named storage provider as a location to store the user profile 112.

The user device 106 may store an identification of the particular storage provider 114 and the account credentials of the user 108 for the particular storage provider on the user device 106. For example, the user device 106 may encrypt the account credentials of the user 108 and store the encrypted account credentials on the user device 106. In another example, the user device 106 may store encrypted account credentials on a remote storage provider that may be accessed by the user device 106.

In some implementations, when a user does not have an account with a particular storage provider and selects the particular storage provider to store the user profile 112, the user device 106 may register the user 108 with the particular storage provider. For example, the user device 106 may create an account for the user 108 with the particular storage provider using user information previously entered for a user profile.

The user device 106 may register the user 108 using one or more account generation rules. For example, the user device 106 may include account generation rules corresponding to particular storage providers, and create an account for the user 108 on a particular storage provider using a subset of the account generation rules that correspond to the particular storage provider. In some implementations, the user device 106 may provide, to the user 108, the account credentials for the account the user device 106 created. For example, the user device 106 may display the account credentials in an interface to the user 108 or e-mail the account credentials to the user 108.

In response to receiving user information and a storage provider location through the user interface 110, the user device 106 may generate the user profile 112 based at least on the user information and store the user profile 112 in the storage provider location. For example, the user device 106 may generate an extensible markup language (XML) document that indicates types of user information and the values entered by the user 108 for the types of user information, provide account credentials and the XML document to a particular cloud storage provider corresponding to the storage provider location, and store a user profile location indicator that indicates where the user profile is stored. The user profile 112 may be formatted according to an electronic data format, such as, for example, JavaScript Object Notation (JSON), Comma Separate Values (CSV), Hypertext Markup Language (HTML), or other formats. In some implementations, the user profile 112 may include the privacy settings of the user. In other implementations, the privacy settings may not be included in the user profile 112 and may be separately stored on the user device 106.

In some implementations, the user device 106 may store the user profile 112 on the particular storage provider 114 based at least on a storage rule associated with the particular storage provider 114. For example, a storage rule may be that the user profile 112 (i) has a particular naming convention to satisfy naming requirements of the particular storage provider and (ii) be stored using a particular application programming interface (APIs) of the particular storage provider 114. In another example, a storage rule may be that the user profile 112 (i) has a different naming convention to satisfy different naming requirements of another storage provider and (ii) be stored using APIs of the other storage provider. In some implementations, the user device 106 may select a storage rule associated with the particular storage provider 114 from a collection of storage rules associated with corresponding storage provider locations. For example, the user device 106 may include at least one storage rule for each of the storage providers that the user 108 can select.

The user device 106 may receive a request from the user to access a network resource associated with the particular storage provider 114. For example, the user device 106 may receive a request from the user 108 to access a website of a particular retailer. The user device 106 may receive the request through the user interface 110. For instance, the user interface 110 may enable the user 108 to enter a particular universal resource locator (URL) to access, where the particular URL is associated with a network resource of the user information consumer 118. In another instance, the user interface 110 may enable the user to select a particular user information consumer to access a network resource configured to be specifically accessed through the application.

In response to receiving the request to access the network resource, the user device 106 may obtain the user profile 112 stored on the user profile storage provider 114. For example, the user device 106 may determine that the particular storage provider 114 stores the user profile 112 based on a user profile location indicator stored on the user device 106, decrypt stored account credentials of the user 108 for the particular storage provider 114, provide a request to the storage provider 114 for the user profile 112 along with the account credentials of the user 108, and receive the user profile 112 from the storage provider 114.

In obtaining the user profile 112 from the storage provider 114, the user device 106 may select one or more storage rules associated with the storage provider 114 from a collection of storage rules associated with corresponding storage provider locations and obtain the user profile 112 using the storage rules. For example, the user device 106 may obtain storage rules for a particular storage provider that specify that a user profile will be stored with a particular name and can be accessed using a particular API.

The user device 106 may determine to obtain the user profile 112 in response to determining that the user 108 has requested to access a network resource that is associated with a particular user information consumer that the user 108 has specified to share user information. For example, the user device 106 may determine from privacy settings that the user 108 has requested to access a network resource associated with a particular user information consumer, where the user 108 has specified to share user information with the particular user information consumer 118, and in response, determine to obtain the user profile 112. In another example, if the user device 106 determines that the user has requested to access a network resource that is not associated with a user information consumer for which the user 108 has specified to share any user information, the user device 106 may not access the user profile.

In response to receiving the user profile 112, the user device 106 may generate a user information collection 116. A user information collection 116 may be a collection of information about the user, where the information may include information in the user profile 112 or abstractions of information in the user profile 112. For example, the user device 106 may receive a name, birthday, and street address of the user 108, and in response, generate a user information collection that does not include the user's name, includes a birthday for the user, and includes a user's city of residence without the street address.

The user device 106 may generate the user information collection 116 based at least on the privacy settings of the user 108 for the particular user information consumer 118. For example, the user device 106 may determine that for a particular retailer, the privacy settings of the user 108 indicate that the user 108 wants to share the user's birthday and city of residence, and in response, the user device 106 may include the user's birthday in the user information collection 116, abstract the street address of the user to a city of residence, and include the city of residence in the user information collection 116. In another example, the user device 106 may determine that the privacy settings of the user 108 indicate that the user 108 wants to share the user's age range and gender, and in response, the user device 106 may abstract the user's birthday to an age range, e.g., 30-39 years old, and include the user's age range and gender in the user information collection 116. In some implementations, the user device 106 may generate additional information for the user information collection 116 that the user did not explicitly input. For example, a user may indicate stores that the user likes to shop at and that the user device 106 may share item preferences but not store preferences, and in response, the user device 160 may determine that the user has a preference for patterned clothing and include that preference in the user information collection 116 without including the store preferences.

The user device 106 may provide the user information collection 116 to the user information consumer 118, and in response, receive customized content 120 that is customized based at least on the user information collection 116. For example, the user device 106 may provide a retailer with a user information collection that indicates the user is a 30-39 year old male, and in response, receive customized content that is targeted to males between the ages of 30-39.

In some implementations, the user device 106 may provide the user information collection 116 to the user information consumer 118 in a request to access a network resource of the user information consumer 118. For example, encoded as a parameter in a URL used to access the network resource. In other implementations, the user device 106 may provide the user information collection 116 before providing the request to access the user information consumer 118. For example, in establishing a session for the user 108 with the user information consumer 118. In yet other implementations, the user device 106 may provide the user information collection 116 after providing the request to access the user information consumer 118. For example, in response to a request from the user information consumer 118 for user information.

In some implementations, other user interfaces may be used. For example, an interface may include a calendar selector for a user to select a birthday date from a displayed calendar and a slider with portions that correspond to different degrees of sharing for the user's age. In another example, after providing the user information and after specifying the storage provider, the user device 106 may present another user interface through which user may specify privacy settings for portions of the user information. In yet another example, the user device 106 may initially present an interface for specifying privacy settings for a particular user information consumer after the user device 106 receives a request to access a network resource associated with the particular user information consumer 118.

The user profile storage providers 114 may be storage providers that may store the user profile 112 for the user device 106. For example, the storage providers 114 may be file sharing services or cloud based storage services. The storage providers 114 may store the user profile 112 in an account that is accessible using account credentials of the user 108. Accordingly, in some implementations, the user 108 may have control over the user profile 112. For example, when the user 108 deletes the user profile 112 from the storage provider 114, the user profile 112 may be removed from the system 100.

The user information consumer 118 may be an entity that consumes user information to provide content customized based at least on the user information. For example, the user information consumer may include a server of a retailer, service provider, or content provider that provides network resources that are customized based on a user's geographic location, age, gender, brand preferences, occupation, income, or other user information.

Different configurations of the system 100 may be used where functionality of the application provider 102, the user device 106, the storage provider 114, and the user information consumer 118 may be combined, further separated, distributed, or interchanged.

Figure 2:
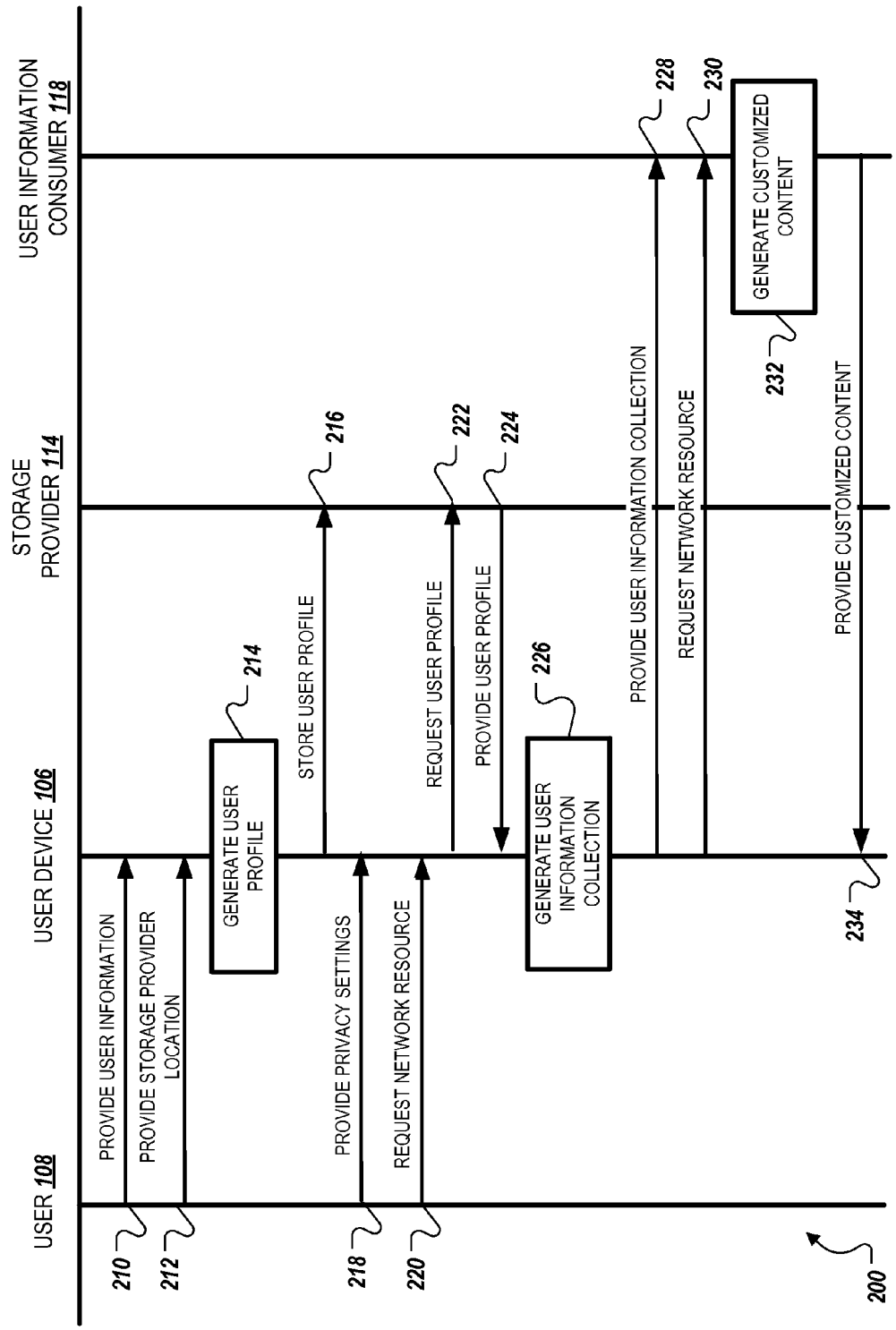
FIG. 2 is an interaction diagram of an example interaction of sharing information.

FIG. 2 is an interaction diagram 200 of an example interaction of sharing information. The following describes the interaction as being performed by components of the system 100 that are described with reference to FIG. 1. However, the interaction may be performed by other systems or system configurations.

Initially, the user 108 may provide user information to the user device 106 (210). For example, the user 108 may provide a birthday, full street address, gender, occupation, income, brand preference, and other information about the user. The user 108 may provide the user information through a user interface that is displayed when a user first uses an information sharing application installed on the user device 106. In another example, the user may provide additional information through a user interface on the user device 106 after initially providing user information.

The user 108 may provide a storage provider location to the user device (212). For example, the user 108 may specify, through a user interface, the particular storage provider 114 as the storage provider to store a user profile. In providing the storage provider location, the user 108 may identify a particular storage provider and account credentials of the user for accessing the storage provider.

The user device 106 may generate a user profile based at least on the user information (214). For example, the user device 106 may process the user information entered by the user 108 to generate a XML document that specifies types of user data and values entered by the user, e.g., specifies a user's birthday, specifies a user's full street address, specifies a user's gender, or specifies other entered user information.

The user device 106 may store the user profile on the storage provider 114 (216). For example, the user device 106 may access the storage provider 114 using the storage provider location received from the user 108 and store the user profile on the storage provider 114 using one or more storage rules corresponding to the storage provider 114.

The user 108 may provide privacy settings (218). For example, the user 108 may specify for each user information consumer, the degree of user information to share for a particular type of user information. In a particular example, the user 108 may provide privacy settings that specify a particular user information consumer receive a user's birthday and city of residence, and another user information consumer receive a user's age range and full street address.

The user 108 may request a network resource associated with the user information consumer 118 (220). For example, the user 108 may enter a URL associated with a network resource associated with the user information consumer 118. In another example, the user 108 may provide a request by selecting an icon associated with the user information consumer 118 displayed on the user device 106.

The user device 106 may provide a request for the user profile to the storage provider 114 (222). For example, the user device 106 may provide account credentials for the user for the storage provider 114 and identify an XML document including the user information. In another example, the user device 106 may select one or more storage rules corresponding to the storage provider 114 from a collection of storage rules and request the user profile based at least on the selected one or more storage rule.

The storage provider 114 may provide the user profile to the user device 106 (224). For example, the storage provider 114 may provide an XML document including the user information to the user device 106. In another example, the storage provider 114 may provide an encrypted file including the user information, where the encrypted file is in a format specific to an application for sharing information on the user device 106.

The user device 106 may generate user information collection based at least on the privacy settings and the user profile (226). For example, the user device 106 may generate a user information collection that includes a user's age range and city of residence, where the user information collection is generated from user information in the user profile that indicates a user's birth day and a full street address. The user device 106 may abstract the information in the user profile in accordance with the privacy settings for the particular user information consumer associated with the requested network resource. For example, the user device 106 may abstract a full street address to a city of residence based on privacy settings that indicate a user only wishes to share the user's city of residence with a particular user information consumer.

The user device 106 may provide the user information collection to the user information consumer 118 (228). For example, the user device 106 may provide a XML document including the user information collection to the user information consumer 118. In another example, the user device 106 may access the network resource using a URL that encodes the user information collection.

The user device 106 may request the network resource associated with the user information consumer 118 (230). For example, the user device 106 may provide a request for a particular URL to a server of the user information consumer 118.

The user information consumer 118 may generate customized content based at least on the user information collection (232). For example, a user information consumer 118 may receive a user information collection that indicates the user's age range and city of residence, and in response, generate a webpage with products that are popular with users of the age range living in the city of residence.

The user information consumer 118 may provide the customized content to the user device 106 (234). For example, the user information consumer 118 may provide, to the user device 106, the webpage with products that are popular with users of the age range living in the city of residence.

Figure 3:
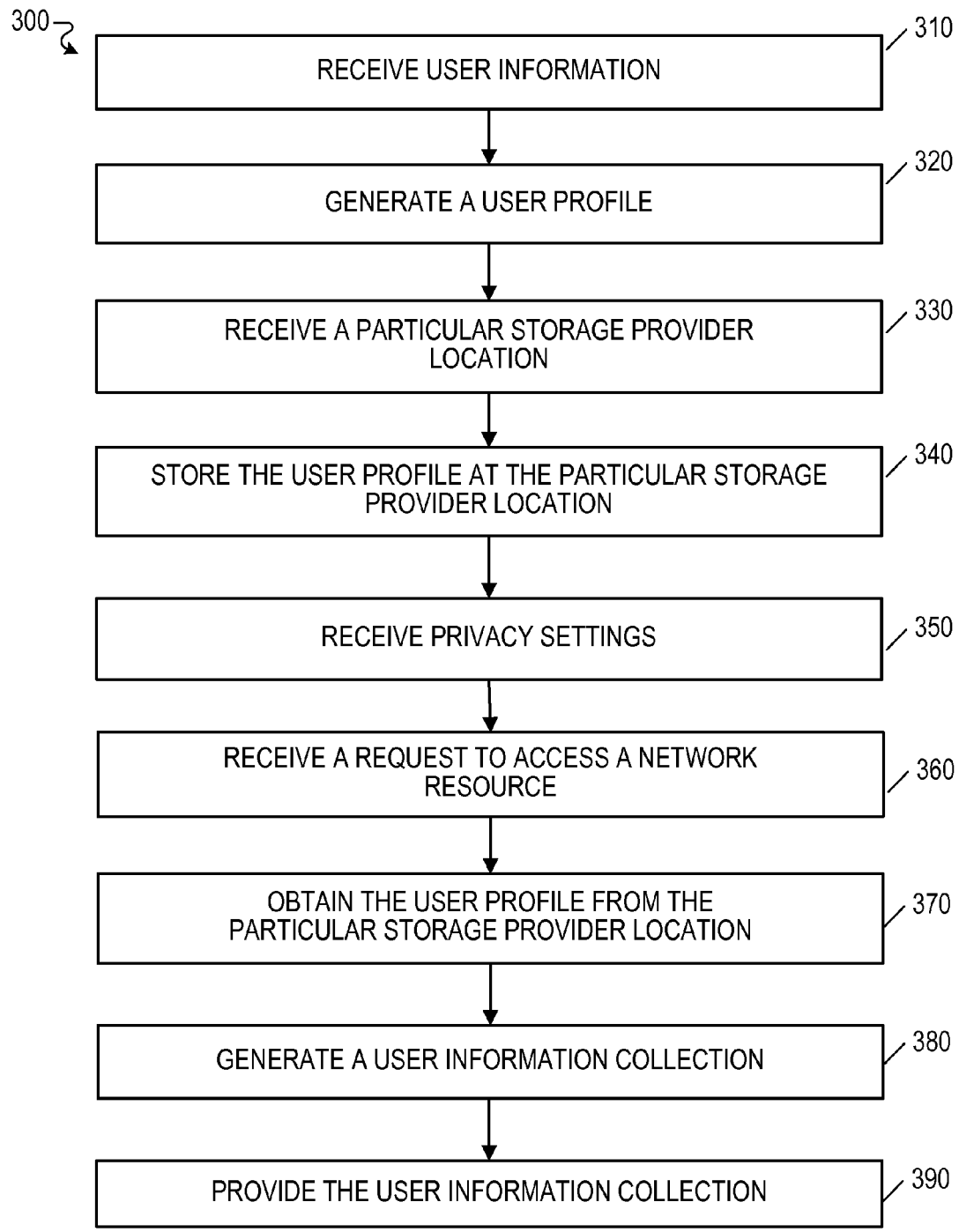
FIG. 3 is a flowchart of an example process for sharing information.

FIG. 3 is a flowchart of an example process 300 for sharing information. At 310, user information entered by the user is received through a user interface of the user device. At 320, a user profile is generated based at least on the user information.

At 330, a particular storage provider location is received from the user through the user interface. In some cases, receiving the particular storage provider location from the user through the user interface includes receiving, through the user interface, (i) an identification of the particular storage provider location and (ii) account credentials, of the user, associated with the particular storage provider location. In some of these cases, obtaining the user profile from the particular storage provider location includes providing the account credentials to the particular storage provider location, selecting a storage rule associated with the particular storage provider location from a collection of storage rules associated with corresponding storage provider locations, and obtaining the user profile from the particular storage provider location based on the storage rule.

At 340, the user profile is stored at the particular storage provider location. In some cases, storing the user profile at the particular storage provider location includes selecting a storage rule associated with the particular storage provider location from a collection of storage rules associated with corresponding storage provider locations, and storing the user profile at the particular storage provider based at least on the storage rule.

At 350, privacy settings are received from the user, the privacy settings specifying portions of the user information to be provided to particular user information consumers. At 360, a request is received from the user to access a network resource associated with a particular user information consumer. At 370, a user profile is obtained from the particular storage provider location.

At 380, a user information collection is generated including at least a portion of the user information from the user profile. In some cases, generating the user information collection includes abstracting the portion of the user information based at least on the privacy settings.

In some cases, the process 300 includes receiving content from the particular user information consumer, where the content is customized based at least on the generated user information collection.

In some cases, the privacy settings specify an amount of abstraction for the portions of the user information to be provided to particular user information consumers.

Figure 4:
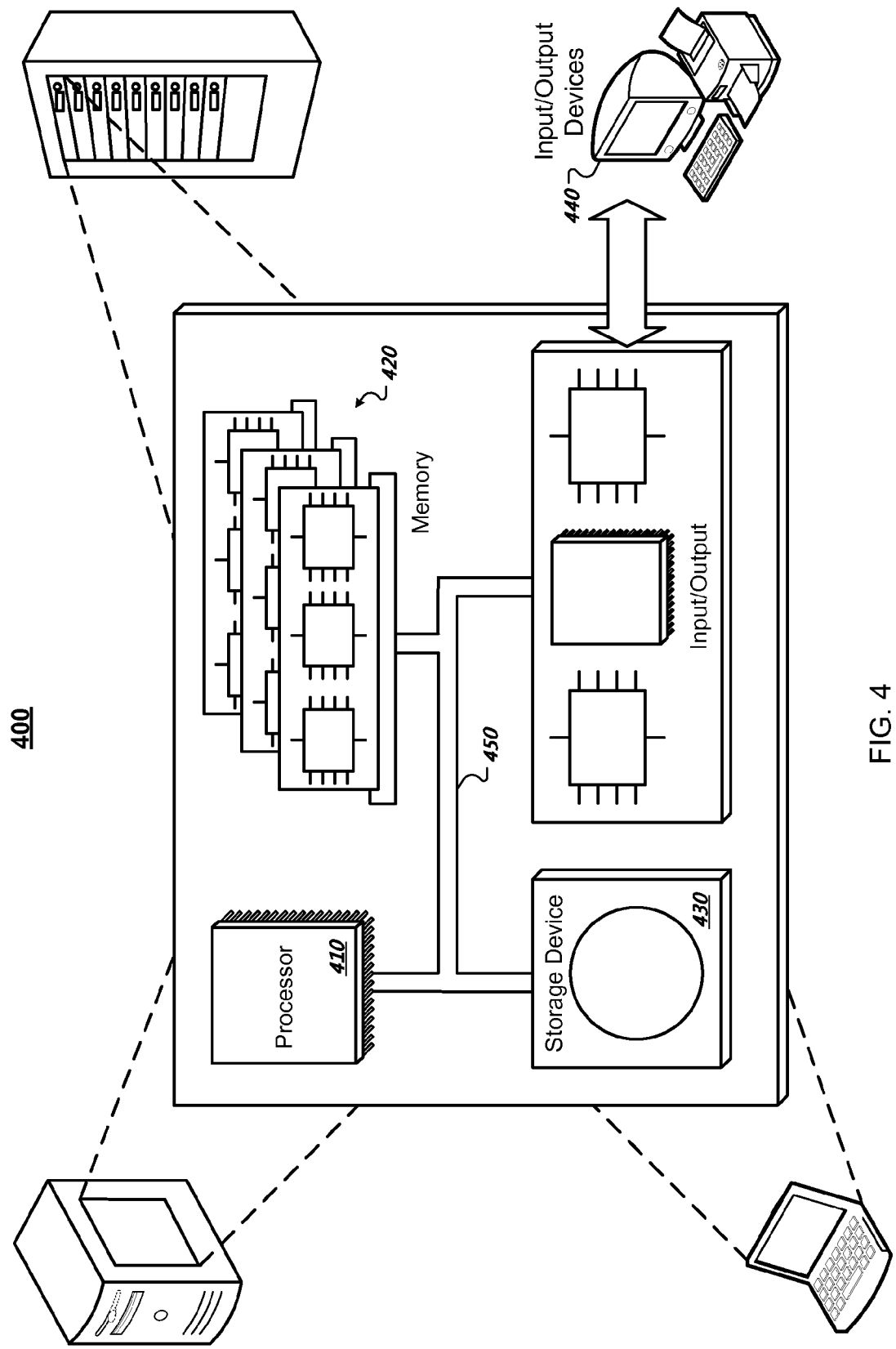
FIG. 4 illustrates a schematic diagram of an exemplary generic computer system.

FIG. 4 illustrates a schematic diagram of an exemplary generic computer system. The system 400 can be used for the operations described in association with the processes 300 according to some implementations. The system 400 may be included in the system 100.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method performed by a user computing device, the method comprising:
   receiving user information entered by a user through a user interface executed by the user computing device;
   generating, by the user computing device, a user profile based at least on the user information;
   receiving, by the user computing device, an identification of a particular storage provider location from the user through the user interface;
   communicating, by the user computing device, the user profile to a storage provider for storage at the particular storage provider location;
   receiving privacy settings entered by the user through the user interface executed by the user computing device, the privacy settings specifying portions of the user information to be provided to particular user information consumers that are individually identified in the privacy settings, the privacy settings further specifying at least two different portions of the user information to be provided, respectively, to at least two different user information consumers that are individually identified in the privacy settings; and
   receiving, by the user computing device, a request from the user to access, over a network, a network resource associated with a particular user information consumer and, in response to receiving the request:
      obtaining, by the user computing device, the user profile, including the user information, from the particular storage provider location;
      generating, by the user computing device, a user information collection including at least a portion of the user information obtained from the particular storage provider location, the portion of the user information specified for the particular user information consumer in the privacy settings;
      communicating, by the user computing device, over the network, the generated user information collection, including the portion of the user information, to the particular user information consumer; and
      receiving, by the user computing device, content from the particular user information consumer, wherein the content is customized based at least on the generated user information collection.

2. The method of claim 1, wherein generating a user information collection including at least a portion of the user information from the user profile comprises:
   abstracting the portion of the user information based at least on the privacy settings, including substituting, according to the privacy settings, a range of values for a particular value that is present in the user profile.

3. The method of claim 1, wherein receiving an identification of a particular storage provider location from the user through the user interface comprises:
   receiving, through the user interface, (i) an identification of the particular storage provider location and (ii) account credentials, of the user, associated with the particular storage provider location.

4. The method of claim 3, wherein obtaining the user profile from the particular storage provider location comprises:
   providing the account credentials to the particular storage provider location;
   selecting a storage rule associated with the particular storage provider location from a collection of storage rules associated with corresponding storage provider locations; and
   obtaining the user profile from the particular storage provider location based on the storage rule.

5. The method of claim 1, wherein storing the user profile at the particular storage provider location comprises:
   selecting a storage rule associated with the particular storage provider location from a collection of storage rules associated with corresponding storage provider locations; and
   storing the user profile at the particular storage provider based at least on the storage rule.

6. The method of claim 1, wherein the privacy settings specify an amount of abstraction for the portions of the user information to be provided to particular user information consumers.

7. A system comprising:
a user computing device and one or more storage devices storing instructions that, when executed by the user computing device, cause the user computing device to perform operations comprising:
receiving user information entered by a user through a user interface executed by the user computing device;
generating, by the user computing device, a user profile based at least on the user information;
receiving, by the user computing device, an identification of a particular storage provider location from the user through the user interface;
communicating, by the user computing device, the user profile to a storage provider for storage at the particular storage provider location;
receiving privacy settings entered by the user through the user interface executed by the user computing device, the privacy settings specifying portions of the user information to be provided to particular user information consumers that are individually identified in the privacy settings, the privacy settings further specifying at least two different portions of the user information to be provided, respectively, to at least two different user information consumers that are individually identified in the privacy settings; and
receiving, by the user computing device, a request from the user to access, over a network, a network resource associated with a particular user information consumer and, in response to receiving the request:
  obtaining, by the user computing device, the user profile, including the user information, from the particular storage provider location;
  generating, by the user computing device, a user information collection including at least a portion of the user information obtained from the particular storage provider location, the portion of the user information specified for the particular user information consumer in the privacy settings;
  communicating, by the user computing device, over the network, the generated user information collection, including the portion of the user information, to the particular user information consumer; and
  receiving, by the user computing device, content from the particular user information consumer, wherein the content is customized based at least on the generated user information collection.

8. The system of claim 7, wherein generating a user information collection including at least a portion of the user information from the user profile comprises:
abstracting the portion of the user information based at least on the privacy settings.

9. The system of claim 7, wherein receiving an identification of a particular storage provider location from the user through the user interface comprises:
receiving, through the user interface, (i) an identification of the particular storage provider location and (ii) account credentials, of the user, associated with the particular storage provider location.

10. The system of claim 9, wherein obtaining the user profile from the particular storage provider location comprises:
providing the account credentials to the particular storage provider location;
selecting a storage rule associated with the particular storage provider location from a collection of storage rules associated with corresponding storage provider locations; and
obtaining the user profile from the particular storage provider location based on the storage rule.

11. The system of claim 7, wherein storing the user profile at the particular storage provider location comprises:
selecting a storage rule associated with the particular storage provider location from a collection of storage rules associated with corresponding storage provider locations; and
storing the user profile at the particular storage provider based at least on the storage rule.

12. The system of claim 7, wherein the privacy settings specify an amount of abstraction for the portions of the user information to be provided to particular user information consumers.

13. A non-transitory computer-readable medium storing software comprising instructions executable by one or more computers which, upon such execution, cause the one or more computers to perform operations comprising:
receiving user information entered by a user through a user interface executed by the one or more computers;
generating, by the one or more computers, a user profile based at least on the user information;
receiving, by the one or more computers, an identification of a particular storage provider location from the user through the user interface;
communicating, by the one or more computers, the user profile to a storage provider for storage at the particular storage provider location;
receiving privacy settings entered by the user through the user interface executed by the one or more computers, the privacy settings specifying portions of the user information to be provided to particular user information consumers that are individually identified in the privacy settings, the privacy settings further specifying at least two different portions of the user information to be provided, respectively, to at least two different user information consumers that are individually identified in the privacy settings; and
receiving, by the one or more computers, a request from the user to access, over a network, a network resource associated with a particular user information consumer and, in response to receiving the request:
  obtaining, by the user computing device, the user profile, including the user information, from the particular storage provider location;
  generating, by the user computing device, a user information collection including at least a portion of the user information obtained from the particular storage provider location, the portion of the user information specified for the particular user information consumer in the privacy settings;
  communicating, by the user computing device, over the network, the generated user information collection, including the portion of the user information, to the particular user information consumer; and
  receiving, by the user computing device, content from the particular user information consumer, wherein the content is customized based at least on the generated user information collection.

14. The medium of claim 13, wherein generating a user information collection including at least a portion of the user information from the user profile comprises:
abstracting the portion of the user information based at least on the privacy settings.

15. The medium of claim 13, wherein receiving an identification of a particular storage provider location from the user through the user interface comprises:

receiving, through the user interface, (i) an identification of the particular storage provider location and (ii) account credentials, of the user, associated with the particular storage provider location.

16. The medium of claim 15, wherein obtaining the user profile from the particular storage provider location comprises:
provising the account credentials to the particular storage provider location;
selecting a storage rule associated with the particular storage provider location from a collection of storage rules associated with corresponding storage provider locations; and
obtaining the user profile from the particular storage provider location based on the storage rule.

17. The medium of claim 13, wherein storing the user profile at the particular storage provider location comprises:
selecting a storage rule associated with the particular storage provider location from a collection of storage rules associated with corresponding storage provider locations; and
storing the user profile at the particular storage provider based at least on the storage rule.

\* \* \* \* \*